United States Patent [19]
Dekking

[11] B 3,914,340
[45] Oct. 21, 1975

[54] BLOCK COPOLYMERIZATION WITH AZOAMIDINO COMPOUNDS AS INITIATOR

[75] Inventor: Henri G. G. Dekking, Rootstown, Ohio

[73] Assignee: The General Tire & Rubber Company, Akron, Ohio

[22] Filed: Sept. 25, 1972

[21] Appl. No.: 292,140

[44] Published under the Trial Voluntary Protest Program on January 28, 1975 as document no. B 292,140.

Related U.S. Application Data

[62] Division of Ser. No. 42,894, June 2, 1970.

[52] U.S. Cl. ............ 260/884; 260/2 R; 260/29.2 N; 260/29.2 TN; 260/29.6 R; 260/29.6 RB; 260/29.6 MN; 260/77.5 CH; 260/78 R; 260/84.7; 260/88.7 D; 260/89.1; 260/93.5 A; 260/874; 260/878; 260/879; 260/881; 260/885; 260/886
[51] Int. Cl.² .......................................... C08L 27/06
[58] Field of Search ................... 260/884, 899, 29.6 R, 29.6 RB, 260/29.6 MN, 878, 874, 879, 885, 886

[56] References Cited
UNITED STATES PATENTS

| | | | |
|---|---|---|---|
| 3,058,943 | 10/1962 | Gray et al. | 260/899 |
| 3,135,717 | 6/1964 | Gregorian et al. | 260/884 |
| 3,342,920 | 9/1967 | Fukushima et al. | 260/899 |
| 3,442,780 | 5/1969 | Levine | 260/884 |
| 3,511,896 | 5/1970 | Harmer | 260/884 |

Primary Examiner—Harold D. Anderson
Attorney, Agent, or Firm—Bosworth, Sessions & McCoy

[57] ABSTRACT

This invention comprises novel amidino type reaction products of azodiimidoether hydrogen halides with hydrocarbon diamines in various ratios, some of said reaction products incorporating particular diamines which provide surfactant properties, further reaction products of the azoamidinoimine reaction products with organic diisocyanates or dicarboxylic acid halides, e.g., ethylene bischloroformate, the use of all these novel products as polymerization catalysts, especially in emulsion systems and amine-terminated polymers and their preparation.

9 Claims, No Drawings

BLOCK COPOLYMERIZATION WITH AZOAMIDINO COMPOUNDS AS INITIATOR

CROSS REFERENCE TO RELATED APPLICATION

This application is a division of U.S. Pat. application Ser. No. 42,894 filed June 2, 1970.

BACKGROUND OF THE INVENTION

Heretofore, the most conveniently used polymerization initiators have been peroxides, such as benzoyl peroxide, as described in *Vinyl and Related Polymers* by Calvin E. Schildknecht, John Wiley and Sons, Inc., N.Y., N.Y. (1952) page 77. However, as pointed out by Schildknecht, oxygen compounds generally inhibit emulsion polymerization and produce a product deficient in plasticity and tackiness. U.S. Pat. Nos. 2,628,222 and 2,666,042 illustrate the preparation of polymers in water using combinations of emulsifying agents with peroxides, per-acids, per-salts and per-esters. The effect of peroxy inhibition of polymerization is more pronounced with certain monomers, such as vinyl chloride, than with others, such as styrene. Thus, efforts have been directed to the development of a new class of initiators without the limitations of the peroxide initiators. It is desirable that such new initiators be water soluble and have multiple reactive functions.

It has been found that certain substituted azonitriles are polymerization initiators. One such azonitrile disclosed in U.S. Pat. No. 2,471,959 is alpha,alpha'-azodiisobutyronitrile. However, this initiator is not water soluble. Other azonitrile initiators have also been developed as disclosed, for instance, in U.S. Pat. No. 2,556,876. Other references of interest are J. Polymer Sci., Vol. 7, 537 (1951) and Die Makromolekulare Chemie, Vol. 103, pages 301–303 (1967). None of these references, however, teaches how to produce the initiators or the polymers of this invention.

The principal object of this invention is to provide novel useful free radical polymerization initiators. Another object is to provide such initiators which are water soluble and consequently particularly useful in emulsion polymerization systems. It is a still further object of this invention to provide a method of producing block copolymers by the use of such novel initiators.

Prior to this invention copolymeric latices of water-insoluble monomers have required the presence of emulsifiers and/or protective colloids. However, films formed from such latices are sensitive to water because of the presence of the free surfactants, and such films consequently stain and become opaque in contact with water. Efforts have been made to solve this problem by using water-soluble monomers in latex copolymers thereby severely reducing the need for free surfactants or even obviating them, but even these copolymers form water-sensitive films.

Another of the objects of this invention is to provide a method of making polymeric latices of water-soluble monomers without the need for free surfactants. Films from such latices will maintain strength and stay clear in contact with water.

There has been a constant search for polymers, especially high polymers, with extremely active terminal groups and for methods of making such polymers. Previously known systems have produced polymers, usually of relatively low molecular weight, which are terminated with hydroxyl, thiol, carboxyl or cyano groups. See, for example, British Specification No. 1,039,150 and *Macromolecular Syntheses*, Vol. 2, pages 87–90. Even the presently available telechelic polymers are low molecular weight polymers.

Another object of this invention is to provide a method of easily making amine-terminated polymers. A still further object is to provide higher molecular weight polymers than have been known heretofore but having a high degree of reactivity.

There is apparently only one system presently known in the art which is an aqueous vinyl block polymerization system, but this system worked only with certain limited vinyl monomers and did not make use of a polymeric initiator. However, even polymeric initiators used to date have not been usable in water.

Another object of this invention is to provide an aqueous block copolymerization system which works with all vinyl monomers.

SUMMARY OF THE INVENTION

These objects as well as others which are apparent from the following description are satisfied by this invention which has as its basic feature a series of ethanol-soluble azoamidinoimine compounds containing at least one azo group —N=N— attached to at least one pair of adjacent aliphatic carbon atoms the more remote of which has attached thereto an imino salt group and an imino group which is attached to a divalent hydrocarbon group. More specifically, the preferred ethanol-soluble compounds are composed of at least one unit of the general formula

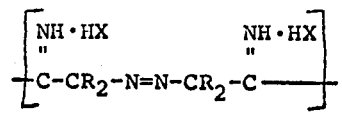

and at least two units selected from the class consisting of —NR'—R''—NR'— and —NR'—R''—NR'$_2$ in which each R is an alkyl or cycloalkyl group of one to six carbon atoms, each R' is a hydrogen atom or a monovalent organic group free of labile hydrogen atoms, each R'' is a divalent organic group free of labile hydrogen atoms and each X is a halogen atom. The R groups on any carbon atom or in any single unit as shown above can be the same or different.

A second facet of this invention is a method for the preparation of the azoamidinoimine compounds by reacting an azodiimidoether hydrogen halide of the general formula

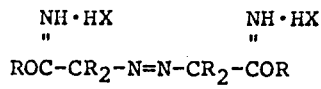

with a polyamino compound of the general formula R'$_2$N—R''NR'$_2$ in each R, R', R'' and X is as defined above and at least one R' on each nitrogen atom is a hydrogen atom.

A third facet of this invention comprises novel compounds which are prepared by coupling the azoamidinoimine compounds in accordance with this invention with difunctional compounds exemplified by organic diisocyanates and diacid chlorides, e.g., bis-chloroformates.

A fourth facet of this invention is the use of any of the azoamidino compounds of this invention, particularly the ethylene diamine derivatives, in a method of polymerizing ethylenically unsaturated compounds which undergo addition polymerization to get amine-terminated polymers.

A fifth facet of this invention comprises the coupling of azoamidino compounds prepared in accordance with this invention with difunctional compounds exemplified by organic diisocyanates and diacid chlorides, particularly bischloroformates, to make block copolymers.

A sixth facet of this invention comprises certain types of the azoamidinoimine compounds of this invention which can be used in making polymeric latices of water-insoluble monomers without the need for free surfactants.

DESCRIPTION OF THE PREFERRED EMBODIMENTS

The preferred initial azoamidinoimine type compounds of this invention contain one or more units of the general formula

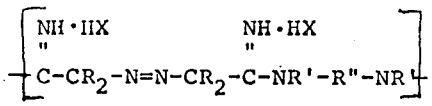

in which each X is a halogen atom, each R is an alkyl group of one to six carbon atoms, each R′ is a hydrogen atom or a monovalent organic group free of labile hydrogen atoms and each R″ is a divalent organic group free of labile hydrogen atoms and containing at least two carbon atoms, each R′ and R″ preferably containing no more than about sixteen carbon atoms. Preferably, at least one R′ in each unit is a hydrogen atom and each R″ is a divalent hydrocarbon group of no more than about six carbon atoms. The terminal groups of these compounds depend primarily on the method of their preparation, but for the most part these compounds have the general formula

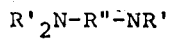

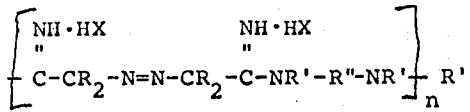

in which each X, R, R′ and R″ is as defined above and n is a positive integer, preferably one.

The novel azoamidino compounds of this invention are produced by reacting an azodiimidoether hydrogen halide with an organic diamine as stated above. The azodiimidoether hydrogen halide is prepared by the reaction of an azonitrile compound in an anhydrous system with an alcohol and a hydrogen halide using a method as shown, for example, in U.S. Pat. No. 2,599,299. The commonest technique involves bubbling the anhydrous hydrogen halide through a slurry of the azonitrile in an anhydrous alcohol and cooling the system to precipitate the product.

Suitable azonitriles which are preferred compounds of the prior art are those in which each azo nitrogen atom is attached to a tertiary carbon atom having attached thereto only a single nitrile group and a total of 2 to 9, preferably 2 to 6, non-aromatic aliphatic carbon atoms. Examples of suitable azonitriles are; alpha-(carbamylazo)-isobutyronitrile, alpha-(carbamylazo)-methyleneanthronitrile, alpha-(carbamylazo)-alpha-phenylpropionitrile, alpha-(carbamylazo)-alpha-cyclopropylpropionitrile, alpha-(carbamylazo)-alpha,alpha-dicyclohexylacetonitrile, alpha,alpha′-azodiisobutyronitrile, alpha,alpha′-azobis(alpha,gamma-dimethylvaleronitrile), alpha,alpha′-azobis (alpha-methylbutyronitrile), alpha,alpha′-azobis(alpha-ethylbutyronitrile), alpha,alpha′-azobis(alkpha-methylenanthonitrile), alpha,alpha′-azobis(alpha-phenylpropionitrile), alpha,alpha′-azobis(alpha-cyclopropylpropinitrile), alpha,alpha′-azobis (alpha-cyclohexylpropionitrile), alpha,alpha′-azobis(alpha-cycloheptylpropionitrile), alpha,alpha′-azobis(alpha-isopropyl-betamethylbutyronitrile), alpha,alpha′-azobis(alpha-n-butyl-capronitrile), alpha,alpha′-obis(alphaisobutyl-gamma-methylvaleronitrile), alpha,alpha′-azobis(alphamethyl-gamma-carboxybutyronitrile), 1,1′-azodicyclohexanecarbonitrile, 1,1′-azodicycloheptanecarbonitrile, 1,1′-azobis(3-methylcyclopentanecarbonitrile) and 1,1′-azobis(2,4-dimethylcyclohexanecarbonitrile).

It is believed that any azonitrile within the scope of U.S. Pat. No. 2,471,959 can be used for the preparation of the novel compounds of this invention. These azonitriles may be prepared generally as described by Thiele and Heuser, Ann. 290, 1–43 (1896); Harmann, Rec. Trav. chim 46, 150–153 (1927); Chem. Weekblad, Vol. 23, pages 77–78, January, 1926; and Dox. J. Am. Chem. Soc. 47, 1471–1477 (1925).

Any organic polyamino compounds the hydrochloride of which is soluble in ethyl alcohol can be employed in the preparation of the initiators of this invention. The preferred polyamino compounds have the general formula R″(NR′$_2$)$_2$ in which each R″ is a divalent organic group free of labile hydrogen atoms and containing at least two carbon atoms, preferably no more than about 16 carbon atoms, and each R′ is either a hydrogen atom or a monovalent organic group.

At least one R′ on each of the defined amino nitrogen atoms must be a hydrogen atom. The organic R′ substituents are preferably hydrocarbon substituents such as, for example, alkyl, aryl, alkenyl or alicyclic groups or their coupled groups such as, for example, alkaryl or aralkyl groups containing up to about 20 carbon atoms. Because of the use of the azoamidino compounds derived from these polyamino compounds, it is preferable that R′ be free of aliphatic unsaturation.

While each R′ and each R″ can be any monovalent and divalent organic group, respectively, free of labile hydrogen atoms, they are preferably hydrocarbon in character. This does not exclude the presence of ether linkages or tertiary amino nitrogen atoms or other types of atoms other than carbon and hydrogen so long as there are no labile hydrogen atoms which might compete with the amino hydrogen atoms R′ in the reactions of this invention. It is entirely possible that various types of other atoms can be present in each R′ and R″ group which will provide additional desirable physical and/or chemical characteristics to the polyamino compounds and/or the azoamidinoimine compounds derived therefrom. The simplest polyamino compounds which can be employed in this invention are diamino compounds of the general formula R′$_2$N(CH$_2$)$_n$NR′$_2$ in which each R′ is a hydrogen atom or an alkyl groups of no more than about 20 carbon atoms, at least one R′ attached to each N is a hydrogen atom and n is a positive integer of about 2 to 6, but even the diamines can contain additional nitrogen atoms free of labile hydrogen atoms. Thus, the term "diamines" in this application refers to compounds in which there are only two amino nitrogen atoms to which are attached labile hydrogen atoms.

Examples of useful diamines are an N,N'-dimethyl-m-phenylenediamine, N,N'-diethyl-m-phenylenediamine, 4-methoxy-N,N'-diisobutyl-m-phenylenediamine, 2-methoxy-N,N'-diisobutyl-m-phenylenediamine, 4-chloro-N,N'-di-n-propyl-m-phenylenediamine, 2-chloro-N,N'-diisobutyl-m-phenylenediamine, 4-ethoxy-N,N'-diisobutyl-m-phenylenediamine, 2-ethoxy-N,N'-diisobutyl-m-phenylenediamine, 2,4'-bis(N-ethylamino)-diphenylether, 4,4'-bis(N-isobutylamino)-diphenylether, 4-isopropyl-N,N'-diisobutyl-m-phenylenediamine, 2-isopropyl-N,N'-diethyl-m-phenylenediamine, 5,6-dimethyl-N,N'-diethyl-m-phenylenediamine, 2,3-dimethyl-N,N'-diisobutyl-p-phenylenediamine, 2,4-dimethyl-N,N'-diethyl-m-phenylenediamine, 4,6-dimethyl-N,N'-diethyl-m-phenylenediamine, 3,6-diemthyl-N,N'-diisobutyl-p-phenylenediamine, methyliminobispropylamine, p-phenylenediamine, o-phenylenediamine, m-phenylenediamine, 1,6-diaminohexane, 1,10-diaminodecane, 1,3-diaminopropane, xylyenediamine, dimethyl-p-phenylenediamine, p,p'-diaminodiphenylmethane, decamethylenediamine, diaminostilbene, N,N'-bis(alpha-carbethoxyacetoacetyl)-hexamethylenediamine, N,N'-bis(alpha-carbethoxyacetoacetyl)-toluylene-2,4-diamine, N,N'-dimethylethylenediamine, N,N'-bis(alpha-carbethoxyacetoacetyl)-4,4'-diaminodiphenylmethane, 2,4-diaminocumene, p,p'-diaminoazobenzene

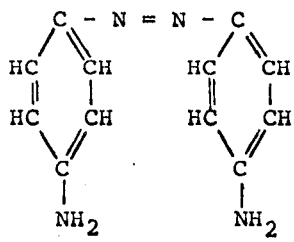

1,4-anthracenediamine, N,N'-dimethylethylenediamine, 4,4'-methylene-biscyclohexylamine, cyclohexyldiamine, toluene-2,4-diamine, toluene-2,6-diamine, benzidine, 3,3'-dimethoxy-4,4'-biphenyldiamine, 3,3'-dichloro-4,4-biphenyldiamine, 4,4'-methylene dianiline and 2,5-fluoroenediamine.

By the method of this invention the azonitrile slurried in alkanol is saturated with a hydrogen halide at a temperature of about 0°–10°C. The resulting product can then be filtered and washed in additional alkanol, and to this slurry is added with stirring the diamine in an amount of at least 1 mole per mole of azodiimidoether hydrogen halide. A solid product should precipitate and is filtered out. However, if no product precipitates, the system can be cooled in an ice bath and the product precipitated out of acetone and filtered or the product can be precipitated by stripping of the alkanol. The solid product is the desired azoamidino compound of this invention.

The alkanol is usually used in amounts of 2 to 10 parts per each part azonitrile. Examples of useful alkanols are methanol, ethanol, propanol, isopropanol, 1-pentanol, 1-hexanol, 4-methyl-3-pentanol and 1-nonanol.

While the terminal groups are not generally viewed as critical for many uses, it is difficult to control or identify the product unless the diamine reacts with the azodiimidoether hydrogen halide in a mol ratio of 2:1. In order to accomplish this readily the diamine should be added to the alkanol slurry of azodiimidoether hydrogen halide in a mol ratio preferably in the range from 4:1 to 6:1.

While the above reaction products are all excellent polymerization initiators, some are polymeric while others are simple, but the simple initiators can be combined simply by tying two molecules of the amine-terminated products with a compound such as organic diacid chloride or an organic diisocyanate, the latter being preferred because no by-product is produced by its reaction. These addition products are also effective polymeric initiators. Furthermore, polymeric initiators prepared by such addition or coupling reactions have controlled molecular weights.

The initiator can be used to polymerize ethylenically unsaturated compounds, that is, to polymerize compounds containing aliphatic carbon-to-carbon double bonds, i.e., olefins, including both monoolefins such as ethylene and substituted ethylenes and diolefins such as butadiene. Generic classes of olefins are, for example, acrylyl and alkacrylyl olefins including acids, esters, nitriles, amides and oxides such as, for example, acrylic acid, alpha-chloroacrylic acid, methacrylic acid, chloroethyl methacrylate, n-butoxyethyl methacrylate, methoxymethyl methacrylate, butyl methacrylate, ethyl methacrylate, methyl methacrylate, acrylonitrile, beta-diethylaminoethyl methacrylate and butadiene monoxide; vinyl and vinylidene halides such as, for example, vinyl chloride, vinyl fluoride, vinylidene chloride and vinylidene fluoride; vinyl carboxylates such as, for example, vinyl acetate, vinyl trimethylacetate, vinyl hexanoate, vinyl laurate, vinyl chloroacetate, vinyl propionate and vinyl stearate; vinyl aryls such as, for example, styrene and vinyl napthalene; other such vinyl compounds as methyl vinyl ketone, vinyl pyridine, vinyl isobutyl ether, vinyl ethyl ether and various vinyl lactams and vinyl imides.

Examples of monomeric diolefins are butadiene and 1,3-hexadiene; substituted diolefins such as 2-chlorobutadiene and 2-fluorobutadiene; carboxylated diolefins such as, for example, diallyl maleate, vinyl methacrylate, allyl methylacrylate, crotyl methacrylate, diallyl phthalate, diallyl carbonate, diallyl adipate, diallyl fumarate, divinyl succinate and divinyl adipate; and esters of alcohols such as, for example, ethylene glycol dimethacrylate, diethylene glycol dimethacrylate, triethylene glycol dimethacrylate, and tetraethylene glycol dimethacrylate.

The azoamidino polymerization initiators contemplated herein are used with the monomer in a weight ratio of about 1 part of monomer to about 0.0001–0.1, preferably about 0.001 to about 0.05, part of azoamidino compound.

In the practice of this invention to polymerize ethylenically unsaturated monomers with the azoamidino acid salt, a small amount of the azo salt is added to a monomer and polymerization is effected by the breaking of some of the azo —N=N—bonds for free radical polymerization. In an emulsion polymerization process, which is preferred, the monomers in the presence of an initiator of this invention are emulsified with water, with a suitable emulsifying agent, if necessary, and polymerization is effected by agitating the emulsion at a temperature of about 50°–100°C. until polymer is formed. This usually requires from about 1 to 10 hours.

Suitable emulsifying agents are, for example, the anionic surfactants such as alkali soaps, the soaps of water-soluble amines, the sulfonated oils and fatty alcohol sulfates, the sulfonaphthenates and petroleum sulfonates, the aromatic sulfonates, the sulfonsuccinic acid esters, the arylalkyl sulfonates, the sulfonated amides as well as other sulfonated compounds. Monomeric surfactants may also be used for stabilization.

When block copolymers are desired, the first monomer and polymeric initiator are put together in water and heated at a temperature and for a time sufficient to exhaust the monomer but not sufficient to decompose all the azo groups, after which time a different monomer is added, and the mixture is again heated at a temperature and for a time sufficient to exhaust the second monomer. In the preparation of copolymers some or all of the azo bonds remaining after the polymerization of the first monomer or monomers break for free radical polymerization of the additional monomers. The resulting polymer precipitates and can be filtered and dried.

There is usually less than 1 percent by weight of the initiator residue in any polymer product. However, when an initiator is employed which also gives surfactant properties to the polymer product, there can be as much as 2 to 5 percent by weight of the initiator residue in the polymer product.

The polymeric initiators of this invention make possible (a) the polymerization in water of all vinyl monomers which can be polymerized in an organic solvent and (b) the block copolymerization in water of monomer combinations, such as acrylamide and acrylic acid or styrene and vinyl chloride, which could not previously be copolymerized at all.

The halogen of the azoamidino acid salt may be chlorine, bromine, iodine or fluorine.

The following examples are merely illustrative and are not intended to limit this invention, the scope of which is properly delineated in the claims. The term "polymer" is used herein to include homopolymers, copolymers, terpolymers and the like. Unless otherwise stated, all quantitative measurements are by weight. For use in these examples, the azodiimidoether hydrochloride was prepared as follows:

A dispersion of 200 gm. of alpha,alpha'-azobisisobutyronitrile in 1,000 cc. of absolute ethyl alcohol was cooled to 0°C. under nitrogen, and anhydrous HCl was bubbled through the slurry for 75 minutes, while a temperature of 5°–10°C. was maintained. The HCl was stopped and the temperature of the reaction mixture was cooled to about 5°C. and kept there for about 16 hours. The resulting solids were filtered off, washed twice with ethyl alcohol, washed once with benzene, washed once with diethylether and dried in vacuo. The yield was 90 percent. The 361 gm. of product was kept in dry ice at −71°C.

An elemental analysis showed the following:

|   | Percent Found | Percent Calculated |
|---|---|---|
| C | 44.19 | 43.8 |
| H | 8.11 | 8.0 |
| O | 9.10 | 9.7 |
| Cl | 21.97 | 21.6 |
| N (Dumas) | 16.24 | 17.0 |
|   | 99.61 | 100.0 |

Melting point determination showed 101°C. with some product decomposition.

The azo product hereinafter referred to as compound A was azobisethylisobutyrimidate hydrochloride:

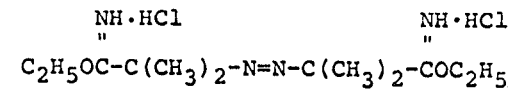

Infrared and ultraviolet spectroscopy data agree with this structure.

EXAMPLE I

Reaction of hexamethylene diamine and compound A

A solution of 22.761 grams of hexamethylene diamine in 125 cc. of ethyl alcohol was cooled in ice water and 21.082 grams of compound A added. After the reactants had been stirred at room temperature for 1.5 hours, 21.062 additional grams of compound A were added, and stirring continued for another 1.5 hours at room temperature. Finally, an additional 22.362 grams of compound A was added amounting to a 1:1 mol ratio between the total compound A and the diamine. The viscous solution was stirred two more hours at room temperature and yielded 53 grams of a polymeric solid by precipitation in acetone. The product had a melting point of 50°C. (with decomposition) and an inherent viscosity in water at 25°C. of 0.037. Infrared and ultraviolet spectroscopy data agree with the expected polymer product made up of units of the formula:

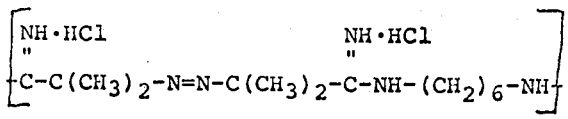

EXAMPLE II

Reaction of methyliminobispropylamine and compound A

To an ice cold solution of 25.0296 gm. of methyliminobispropylamine in 125 cc. of ethyl alcohol there was added 20.040 gm. of compound A. After the reactants had been stirred for 18 minutes at 25°C., there was obtained a clear solution to which there was added another 20.076 gm. of compound A. After another 55 minutes of stirring there was again a clear solution to which was added another 16.644 gm. of compound A. The mol ratio of the diamine to compound A was 1:1.

After one hour of vacuum distillation at room temperature 24 cc. of alcohol was distilled off, and the remaining viscous solution was poured in acetone. There was obtained about 65 gm. of a polymeric material with an inherent viscosity of 0.027 in water at 25°C. The product was made up of units of the formula:

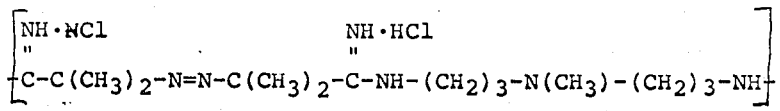

EXAMPLE III

Reaction of trimethylhexamethylenediamine and compound A

To 28.6827 gm. of the subject diamine cooled in ice water, there was added gradually 59.660 gm. of compound A in 79 cc. of ethyl alcohol for 4 hours at 25°C.

$$\langle S \rangle NH-(CH_2)_3-NH-\overset{NH \cdot HCl}{\underset{\shortparallel}{C}}-C(CH_3)_2-N=N-C(CH_3)_2-\overset{NH \cdot HCl}{\underset{\shortparallel}{C}}-NH-(CH_2)_3-NH-\langle S \rangle$$

Most of the alcohol was then removed from the viscous solution by vacuum stripping at room temperature. The residual, very viscous material, was stirred in acetone, the precipitated solids redissolved in alcohol, the solution filtered and just enough acetone added to cause turbidity. On cooling to 0°C., 16 gm. of product precipitated. This was filtered off and dried. It had a melting point of 115°C. and an inherent viscosity in water at 25°C. of 0.026.

The product had the unit formula:

$$\left[ -\overset{NH \cdot HCl}{\underset{\shortparallel}{C}}-C(CH_3)_2-N=N-C(CH_3)_2-\overset{NH \cdot HCl}{\underset{\shortparallel}{C}}-NH-CH_2-CH_2-C(CH_3)_2-CH_2-CH(CH_3)-CH_2-NH- \right]$$

EXAMPLE IV

Reaction of a diamine of the formula $NH_2-(CH_2)_3-NH-CH(CH_3)-(CH_2)_{12}-CH_3$ and compound A To 42.440 gm. of the subject diamine there was added 10.00 gm. of compound A, and the mixture was stirred at room temperature until a clear solution was obtained after which another 10 gm. of compound A was added.

Ten cc. of ethyl alcohol was added and an additional 10.765 gm. of compound A. At this point there was a 1:1 mol ratio of the diamine and compound A. An additional 65 cc. of ethyl alcohol was added during the reaction, and after 3 hours part of the alcohol was removed in vacuo.

The residual viscous solution was poured in acetone producing 52.5 grams of a polymeric precipitate with an inherent viscosity of 0.017 in water at 25°C. and a melting point of 120°C. with decomposition.

The polymer was made up of units of the formula:

$$\left\{ -\overset{NH \cdot HCl}{\underset{\shortparallel}{C}}-C(CH_3)_2-N=N-C(CH_3)_2-\overset{NH \cdot HCl}{\underset{\shortparallel}{C}}-NH-(CH_2)_3-N \atop \qquad\qquad\qquad\qquad\qquad\qquad | \atop \qquad\qquad\qquad\qquad\qquad\qquad CH_3-(CH_2)_{12}-CH-CH_3 \right\}$$

EXAMPLE V

Reaction of N-cyclohexyl-1,3-propanediamine and a compound A

A solution of 93 gm. of N-cyclohexyl-1,3-propanediamine in 300 cc. of absolute ethyl alcohol was cooled in ice water, and 33 gm. of compound A was added. The reactants were stirred for 5 hours at room temperature and then cooled in an ice water bath, and 200 cc. of diethyl ether were added. The product was filtered off, washed in ether, and dried in vacuo at room temperature. There was obtained 44 gm. of product or 80 percent yield. The product was:

The product had a melting point of 133°–135°C. with decomposition. The elemental analysis was as follows:

|  | Found | Calculated |
|---|---|---|
| C | 56.49 | 56.8 |
| H | 9.68 | 9.8 |
| N (Dumas) | 19.07 | 20.3 |
| N (Kheldahl) | 14.43 | 15.2 |
| Cl | 14.56 | 13.0 |

The pH of a 1 percent solution was 9.9.

EXAMPLE VI

Reaction of a long chain alkylene diamine and compound A

A mixture of 100 gm. of $H_2N-(CH_2)_{36}-NH_2$ and 10.0 gm. of compound A was stirred for 2 hours at room temperature. The reaction mixture was poured into acetone, and a product precipitated. The precipitated product was filtered out of the acetone and air dried. The product had a melting point of 114°C. with decomposition and an elemental analysis in weight percentages as follows:

|  | Found | Calculated ($C_{84}H_{174}N_8Cl_2$) |
|---|---|---|
| C | 74.9 | 73.9 |
| H | 11.4 | 12.7 |
| N (Dumas) | 8.1 | 8.2 |
| N (Kheldahl) | 6.1 | 6.1 |
| Cl | 4.3 | 5.2 |

There was a 35.6 gm. (86%) yield of $$H_2N-(CH_2)_{36}-NH-\overset{NH \cdot HCl}{\underset{\shortparallel}{C}}-C(CH_3)_2-N=N-C(CH_3)_2-\overset{NH \cdot HCl}{\underset{\shortparallel}{C}}-NH-(CH_2)_{36}-NH_2$$

This product initiated polymerization of both acrylonitrile and methacrylonitrile in dimethylformamide solutions after stirring for 17 hours at 70°C.

EXAMPLE VII

Reaction of 1,3-(4-piperidyl)propane and compound A

A solution of 50.0 gm. of 1,3-(4-piperidyl)propane in 100 cc. of superdry ethyl alcohol was cooled in an ice bath, and 10.0 gm. of compound A was added. The reactants were stirred in the ice bath for 1 ½ hours. The solids were filtered off, washed in ether and vacuum dried over P₂O₅.

The solids product contained:

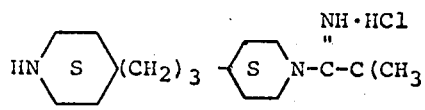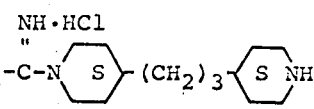

The melting point was 201°C. with decomposition.

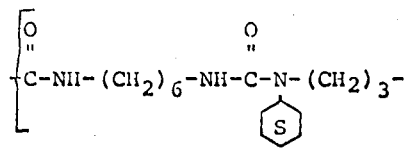

The product was soluble in methanol and water and insoluble in acetone, benezene, acetonitrile, ether, ethyl alcohol, dimethyl formamide, tetrahydrofuran and dimethylsulfoxide.

It is evident that the above preparations and reactions can be accomplished with hydrochlorides which can be prepared in the same manner as that prepared above using the azo nitriles of the prior art as exemplified by the disclosure of U.S. Pat. No. 2,471,959. It is also evident that any of the defined amines can be reacted with the subject azodiimidoether hydrochlorides to produce the desired water-soluble azoamidinoimines.

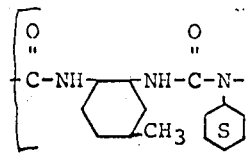

The following examples show the further reaction products which can be prepared using organic diisocyantes and dicarboxylic acid halides and the use of all these novel compounds as polymerization initiators and coupling agents with a variety of monomers.

EXAMPLE VIII

Reaction of azoamidinoimine hydrochloride with hexamethylene diisocyanate

A dispersison of 80.0 gm. of the product of Example V in 480 cc. of N,N-dimethylformamide was cooled in ice water, and 23.4 gm. of hexamethylene diisocyanate were added. After 10 minutes of stirring at room temperature 240 cc. of methanol were added. After the resulting solution was stirred for 0.5 hour, it was poured into acetone producing 102 gm. of precipitated polymer product of the unit formula:

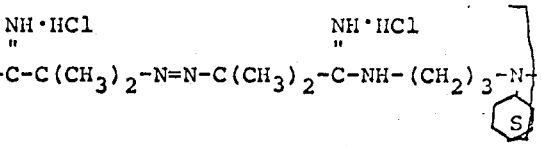

This polymer had an inherent viscosity in water at 25°C. = 2.16.

The above experiment was repeated substituting each of the following azoamidino compounds mol per mol for the product of Example V and substituting toluene diisocyanate in one run mol per mol for the hexamethylene diisocyanate. The product were as shown:

a. Reaction of product of Example V and toluene diisocyanate

The product was a polymer made up of units of the formula:

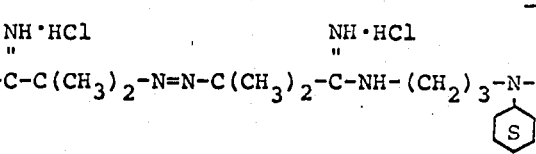

The yield was 83%, and the intrinsic viscosity of the product in water at 25°C. was 1.6.

b. Reaction of hexamethylene diisocyanate and

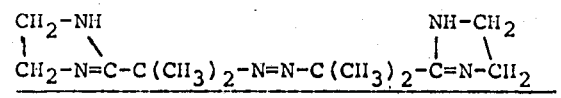

The product was a polymer made up of units of the formula:

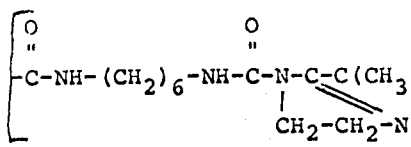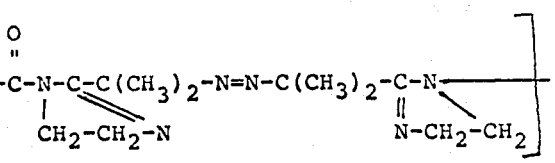

The yield was 62%. The melting point of the product was 55°–60°C. with decomposition, and the inherent viscosity in water at 25°C. was 0.11.

c. Reaction of hexamethylene diisocyanate and

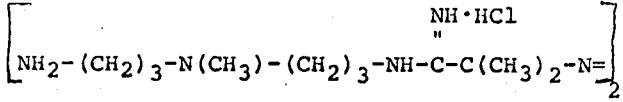

The product was a polymer made up of units of the formula:

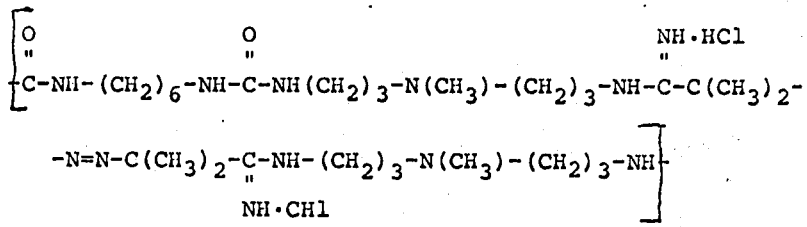

The yield was 61%. The melting point of the product was 70°C. with decomposition, and the intrinsic viscosity in water at 25°C. was 0.2.

d. Reaction of hexamethylene diisocyanate and

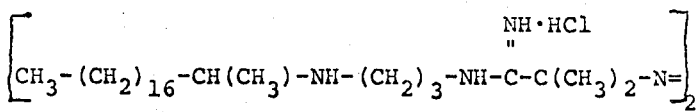

The product was a polymer made up of units of the formula:

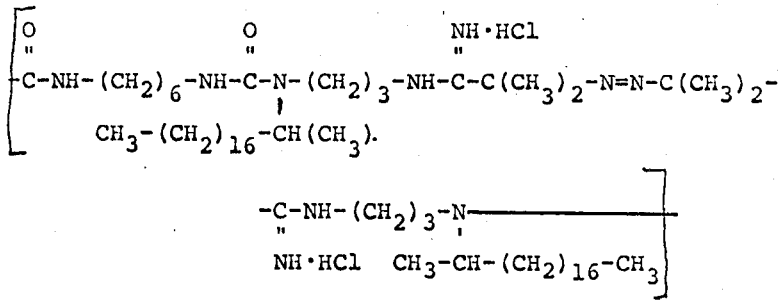

The yield was 13%, and the inherent viscosity in water at 25°C. was 0.23.

EXAMPLE IX

Reaction of 2-gamma-aminopropylenimino-pentadecane and compound A

A cold mixture of 5.0 gm. of

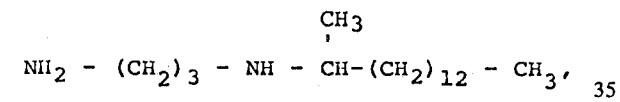

3.0 gm. of compound A and 3 cc. of absolute ethylene alcohol was prepared and allowed to reach room temperature. The alcohol was removed by vacuum leaving as a product a viscous clear material soluble in water, benzene and styrene. The product was:

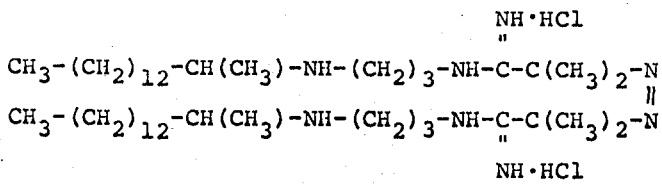

EXAMPLE X

Preparation of styrene-butadiene copolymer

A mixture of 2.0 grams of the product of Example IX blended into 138 cc. of water was acidified with 2.5 cc. of 1 N HCl and then mixed with 50 grams of styrene (which had been washed with dilute NaOH), 50 grams of butadiene and 1 cc. of mixed tertiary mercaptans. After mixing for 18.5 hours at 60°C., the system was cooled and vented to yield a dispersion having pH of 7.7, a kinematic viscosity of 1,960 cps. and 39.5 wt.% total solids which was a styrene-butadiene copolymer.

EXAMPLE XI

Reaction of methyliminobispropylamine and compound A

To an ice cold solution of 87 gm. of methyliminobis-propylamine in 260 cc. of anhydrous ethyl alcohol was added 33 gm. of compound A. The reactants were stirred for 15 minutes in an ice bath and 3 hours at room temperature. The reaction mixture was poured into hexane, resulting in precipitation of 33.4 gm. (63% yield) of a very viscous material which was soluble in water and in dimethylformamide and which had an elemental analysis in weight percentages as follows:

|   | Found | Calculated ($C_{22}H_{52}N_{10}Cl_2$) |
|---|---|---|
| C | 50.2 | 48.7 |
| H | 10.0 | 10.4 |
| N (Dumas) | 26.5 | 24.0 |
| N (Kjeldahl) | 21.5 | 19.7 |
| Cl | 13.5 | 16.5 |

The product was

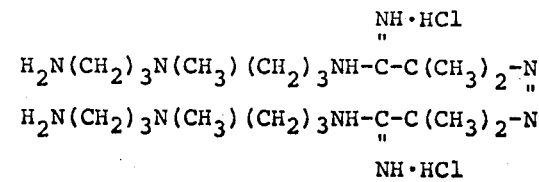

as verified by NMR and U.V. data.

A solution of 4.08 gm. of the above product and 232 gm. of acrylonitrile in 1,000 cc. of dimethylformamide yielded 110 gm. of precipitated polyacrylonitrile polymer after 17 hours at 70°C.

EXAMPLE XII

Reaction of compound A and $NH_2$—$(CH_2)_3$—NH—CH($CH_3$)—$(CH_2)_{16}$—$CH_3$ 347 grams of $NH_2$—$(CH_2)_3$—NH—CH($CH_3$)—$(CH_2)_{16}$—$CH_3$ was cooled to 0°C., and 60 gm. of compound A were added. The reactants were stirred for 2 hours at room temperature, and the resulting oil was poured in a large excess of acetone, producing 82.5 of a waxy precipitate (50% yield) with the following properties:

meqv. total amine/g = 2.54; 2.59
meqv. primary amine/g = 0.72    meqv. t-amine/g = 0.038
MP = 77°C with decomposition
pH of 1% soln. = 7.3

The product was soluble in water, methanol, and ethyl alcohol.

Elemental Analysis:

| | Found | Calculated $C_{52}H_{110}N_8Cl_2$ |
|---|---|---|
| C | 66.2 | 68 |
| H | 12.1 | 12 |
| N (Kjeldahl) | 10.0 | 9.1 |
| N (Dumas) | 13.0 | 12.2 |
| Cl | 9.0 | 7.8 |

Critical Micelle concentration = 0.002–0.003% (T = 38–35 dynes/cm). Infrared and ultraviolet spectra support the expected primary structure:

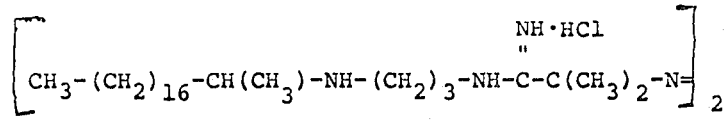

Similar results were obtained using
$NH_2-(CH_2)_3-NHCH(CH_3)-(CH_2)_{11}-CH_3$

Both azo products derived from the two subject amines are able to provide us with a latex of vinyl acetate-2-ethylhexylacrylate, styrene-butadiene and other combinations without the need for additional surfactants and/or protective colloids.

EXAMPLE XIII

Preparation of a vinyl acetate-2-ethylhexylacrylate copolymer latex

A two liter resin kettle was charged with 400 cc. of deionized water, 4 grams of the azoamidino-hydrogen halide of Example XII, 45 grams of vinyl acetate and 15 grams of 2-ethylhexylacrylate. The emulsion was purged with nitrogen and heater to 75°C. with stirring. During the next 230 minutes 520 grams of a 3:1 by weight mixture of vinyl acetate-2-ethylhexylacrylate were added, as well as a cold solution of 10 grams of additional initiator product in 100 cc. of water. The temperature was rasied to 88°C. There was an 86% conversion to polymer. Unreacted monomer was removed by steam distillation, and the product was a stable latex with 31% total solids, a pH of 5.1 and a Brookfield viscosity of 20.5 cps.

It has been demonstrated as follows, that films cast from latices prepared according to the invention are much less water sensitive than films cast from ordinary latices:

A 20 mil thick clear film was cast using the latex produced above. For purposes of comparison a similar vinyl acetate-2-ethylhexylacrylate copolymer latex was prepared using conventional surfactants and a protective colloid in accordance with the prior art, and a film was cast with this conventional latex. The films were air-dried at room temperature for 16 hours and then further air-dried at 50°C. for 3 hours.

The two films were tested for tensile strength and appearance before and after one hour of immersion in deionized at room temperature.

| | Conventional Film | Surfactant Free Film |
|---|---|---|
| Tensile (psi) Dry | 346 | 509 |
| Tensile (psi) Wet | 46 | 428 |

Furthermore, whereas the conventional film becomes almost instantly opaque in water, the surfactant free film is still clear after one hour of water exposure.

EXAMPLE XIV

Preparation of acrylamide-acrylic acid block copolymer in water

A solution of 100 cc. $H_2O$, 5.0 gm. of acrylamide and 0.10 gm. of the azo compound prepared in Example I was purged with nitrogen and heated. After 50 minutes at 60°C. the viscous solution was poured into methanol. A polymer precipitated and was blended twice with methanol and filtered. After filtration the polymer was redissolved in 200 cc. of water and 5.0 grams of acrylic acid was added. The resulting solution was heated under nitrogen. After 4 hours the system was poured into a mixture of methanol-acetone. The solids were removed by filtration and dried under a high vacuum overnight. The yield was 3.5 gm. of a block copolymer of 78.8 weight per cent polyacrylamide.

EXAMPLE XV

Preparation of acrylamide-diacetone acrylamide block copolymer in water

A solution of 25 gm. of acrylamide and 0.5 gm. of the product of Example VI in 500 cc of deionized water was stirred at 70°C for ½ hour under nitrogen. The resulting polyacrylamide was recovered by precipitation in methanol. After thorough washing in methanol to remove any unreacted polymeric initiator, the polyacrylamide was redissolved in 500 cc. of water, and 25 gm. of diacetone acrylamide were added. The reactants were stirred at 70°C. for 2 hours and the polymer precipitated in methanol. The precipitated polymer was extracted with N,N-dimethyl formamide to remove any polydiacetone acrylamide and the insoluble polymer washed in acetone, filtered and dried. There were 11 grams of product which contained 16.64 wt.% nitrogen equivalent to 72.5 wt.% polyacrylamide in the block polymer.

EXAMPLE XVI

Preparation of vinyl chloride-styrene block copolymer in water

A mixture of 200 cc. of water, 3.3 gm. of sodium salt of dodecylbenzene sulfonic acid (a wetting agent), 0.1 gm of $NaH_2PO_4$, 1.0 gm. of the product of Example II and 100 gm. of vinyl chloride was stirred in a reactor for 1 hour at 70°C. Twentyone grams of the resulting latex were withdrawn, and it was determined that 22 gm. of polyvinyl chloride was produced having an inherent viscosity of 0.646 in cyclohexanone at 25°C. To the rest of the latex was added 15 gm. of styrene. After 16 hours at 70°C., the mixture was poured in methanol yielding 23.7 grams of total solids having 43.2 wt.% Cl equivalent to 80 wt.% polymerized vinyl chloride in the block copolymer. Compression molding of this crude product produced an almost clear sheet. A physical blend of 80–20 polyvinyl chloride-polystyrene yields on opaque sheet.

Five grams of the crude product were extracted with benzene. Of the total product 15 wt.% was benzene soluble and analysis for chlorine showed that this fraction consisted of block copolymers of about 20 wt.% polymerized vinyl chloride and about 80 wt.% polymerized styrene. The benzene-insoluble fraction consisted of block copolymers of about 85 wt.% polymerized vinyl chloride and about 15 wt.% polymerized styrene. The inherent viscosity of the benzene-insoluble fraction in cyclohexanone at 25°C. was 0.91.

EXAMPLE XVII

Preparation of vinyl chloride-styrene block copolymers in water

A mixture of 1.0 gm. of polyvinyl alcohol protective colloid, 5 gm. of the product of Example II, 500 gm. of vinyl chloride and 1,500 cc. of water was heated for 1 hour at 60°C. Precipitation in methanol yielded 56 gm. of polyvinyl chloride. A mixture of 75 cc. of water, 25 gm. of the polyvinyl chloride and 25 gm. of styrene was stirred for 3 hours at 70 C. The polymer was washed in methanol, filtered and stirred in benzene. The product contained 35.7 gm. of benzene-insoluble polymer having 34 wt.% Cl equivalent to block copolymers of about 61 wt.% polymerized vinyl chloride and 39 wt.% polymerized styrene and 2.8 gm. of benzene-soluble polymer containing 6 wt.% Cl equivalent to block copolymers of about 11 wt.% polymerized vinyl chloride and 89 wt.% polymerized styrene.

EXAMPLE XVIII

Preparation of vinyl chloride-methylmethacrylate block copolymers in water 5.6 gm. of the polyvinyl chloride produced in the first part of Example XVIII was dispersed in 100 cc. of water and 5.6 gm. methylmethacrylate. After stirring for 2 hours at 70°C., there was obtained 9.1 gm. of polymer. Less than 2 wt.% of this polymer was benzene soluble. The benzene-extracted block copolymer contained 27.2 wt.% chlorine or about 50 wt.% polymerized vinyl chloride and about 50 wt.% polymerized methylmethacrylate.

EXAMPLE XIX

Preparation of vinyl acetate-acrylonitrile block copolymers in water

A mixture of 1,050 cc. of water, 257 gm. of vinyl acetate and 2.0 gm. of the first product of Example VIII was stirred at 60°C. for 53 minutes. The polyvinyl acetate product was precipitated in brine and was found to have an intrinsic viscosity in dimethylformamide at 25°C. of 4.10. The polymer was washed thoroughly in water and redispersed in 800 cc. of water and 200 gm. of acrylonitrile. After stirring the slurry for 3 ⅓ hours at 60°C., there was produced 213 gm. of product containing 6.5 wt. % N equivalent to about 24 wt.% polymerized acrylonitrile. To remove any polyvinyl acetate homopolymer, 10.0 gm. of the crude product was extracted with methanol, producing 60 wt.% of methanol-insoluble fraction containing 10.8 wt.% N equivalent to block copolymers of about 41 wt.% polymerized acrylonitrile and 59 wt.% polymerized vinyl acetate.

To demonstrate the difference between the methanol insoluble fraction and a 59–41 wt.% blend of polyvinyl acetatepolyacrylonitrile, a clear flexible film of the former was cast from a dimethylformamide solution whereas the blend in the same solvent gives a two-phase system because of the incompatibility of the two homopolymers.

EXAMPLE XX

Preparation of methacrylonitrile-methylmethacrylate block copolymers in water

A mixture of 1000 cc. of water, 2.0 gm. of the first product of Example VIII and 200 gm. of methacrylonitrile was stirred for 1 hour at 70°C. The latex containing 126 gm. of polymer was poured in brine and the coagulated polymethyacrylonitrile thoroughly washed in water. Its intrinsic viscosity was 3.62 in acetone at 25°C. The damp cake was then dispersed in 1,000 cc. of water and 200 gm. of methylmethacrylate. After stirring 160 minutes at 70°C., the dispersion was poured in brine, and the resulting coagulated polymer was washed in methanol and dried. The crude product was 275 grams of polymers containing 8.8 wt.% N equivalent to block copolymers of about 42 wt.% polymerized methacrylonitrile and methylmethacrylate. Only 10% of the crude polymer was benzene soluble, showing that very little polymethylmethacrylate homopolymer was formed. The block polymer could be molded into a clear film or bar at 350°F.

Satisfactory butadiene-styrene block copolymers and butadiene-methacrylonitrile block copolymers were also prepared using the general method described above.

Note that it is not necessary to coagulate or isolate the first polymer. The second monomer may simply be added to the latex obtained from the first polymerization.

One organic diamine has been found to react with the azodiimidoether hydrohalides, exemplified by compound A, to produce a halogen-free product which has cyclic imidazolinyl groups. These compounds are also reactive with materials such as organic diisocyanates and di-acid halides to produce polymers.

EXAMPLE XXI

Preparation of 2,2′-azo[bis-2,2′-(2-imidazolinyl)propane]

To an ice cold solution of 20.0 gm. of ethylene diamine in 100 cc. absolute ethyl alcohol was added 20.0 gm. of compound A. After stirring 1 hour at 0°C. and 2 hours at 20°C., there was obtained by filtration 13.3 gm. (87% yield) of a crystaline material. The melting point was found to be 128°–129°C. with decomposition.

The elemental analysis in weight percentages showed:

| Element | Percent Calculated | Percent Found |
|---|---|---|
| C | 57.6 | 56.50 |
| H | 8.8 | 8.71 |
| N (Dumas) | 33.6 | 33.13 |
| N (Kjeldahl) | 22.4 | 21.70 |
| Cl | 0 | 1.61 |
| O | 0 | 0.05 (by difference) |

Infrared and ultraviolet spectroscopy data collected were in agreement with the proposed structure:

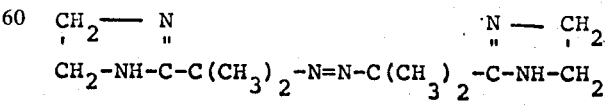

EXAMPLE XXII

Preparation of Amine Terminated Polystyrene

An emulsion consisting of 1,000 cc. of deionized water, 25 grams of a sodium salt of disulfonated dodecycldiphenyloxide, 25 grams of sodium dodecyl benzene sulfonate, 520 grams of styrene and 10 grams of the initiator of Example XXI were stirred and heated at 80°C. After 24 hours the product was 476 grams of polystyrene with an intrinsic viscosity of 0.84 in benzene at 30°C. and contained 0.035 milliequivalent amine/gram.

EXAMPLE XXIII

Preparation of Graft Polymer

Ten grams of commercial high molecular weight maleic anhydride-methyl vinyl ether copolymer were dissolved in 250 cc. of methyl ethyl ketone. To this solution was added 10 grams of the polystyrene product of Example XXII. An additional 50 cc. of methyl ethyl ketone was added and the solution kept at 65°–70°C. for 80 minutes.

Part of the solution was used to cast an almost clear film in contrast to an opaque film cast from a 50–50 blend of ordinary polystyrene and the subject maleic anhydride-methyl vinyl ether copolymer. The rest of the solution was poured in heptane to precipitate the crude product.

5 grams of the crude product were extracted with hot water, followed by several benzene extractions. 2.5 grams were neither soluble in hot water, a known solvent for the maleic anhydride-methyl vinyl ether copolymer, nor in benzene, a known solvent for polystyrene, and was therefor concluded to be a graft polymer of polystyrene on the maleic anhydride-methyl vinyl ether copolymer.

EXAMPLE XXIV

Polymerization of a polyether diisocyanate

To a solution of 32.5064 gm. of a diisocyanate polytetrahydrofuran prepolymer was added 3.485 gm. of the product of Example XXI. After the reactants were stirred at 25°C. for 1 hour, they were poured in water. The rubbery polymeric precipitate is soluble in methanol.

EXAMPLE XXV

Preparation of polyamide from cyclic azo diamine

To 5 gm. of the product from Example XXI dissolved in 50 cc. of water (containing 0.424 gm. of $Na_2CO_3$) was added 0.478 gm. of sebacyl chloride in 25 cc. of carbon tetrachloride. The reactants were shaken vigorously, stirred 10 minutes, filtered to remove the solids and the solids washed with methanol. The yield was 0.16 gm. of the expected corresponding polyamide.

EXAMPLE XXVI

Polymerization of vinyl acetate

A mixture of 0.20 gm. of the product of Example XXI, 50 gm. of vinyl acetate and 100 cc. of methanol was purged with nitrogen and heated to reflux (60°C.) while stirring under nitrogen. After 4 hours, the reaction mixture became slightly viscous, and water was added. The solid polyvinyl acetate was removed by filtration and dried.

Block polymers of vinyl monomers may be prepared by first polymerizing a monomer in the presence of an azo tertiary amine at a temperature low enough not to cause decomposition of the azo compound but high enough to give a good yield of polymer. When a vinyl monomer is chosen which readily undergoes chain transfer with a tertiary amine, the resulting polymer will be terminated in an azo group and can be used to initiate the polymerization of a second vinyl monomer to yield block polymers. In contrast to previously known systems the second monomer can be any vinyl monomer which is polymerizable by means of a free radical initiator.

EXAMPLE XXVII

Preparation of acrylonitrile-methylmethacrylate block copolymer

A mixture of 120 cc. of deionized water, 2gm. of sodium lauryl sulfate, 80 gm. of acrylonitrile, 0.1 gm. of $K_2S_2O_8$, 0.033 gm. of sodium bisulfite and 1.0 gm. of the product of Example XI was stirred for 1 ½ hours at 35°C. The polymer was coagulated in brine, filtered and washed in water and methanol. The inherent viscosity of the polyacrylonitrile in dimethylformamide at 30°C. was 3.81. The polymer was dissolved in 500 cc. of dimethylformamide and 50 gm. of methylmethacrylate. After 17 hours at 60°C. the solution was poured in water and the polymer recovered by filtration. It was washed in methanol and then extracted with benzene.

There was obtained 10 gm. of benzene-insoluble polymer containing about 77.5 wt.% polymerized acrylonitrile and about 22.5 wt.% polymerized methylmethacrylate. This polymer gives a clear film cast from a dimethylformamide solution.

There was also obtained 13 gm. of benzene-soluble polymer containing about 5 wt.% polymerized acrylonitrile and about 95 wt.% polymerized methylmethyacrylate which was molded into a clear film at 350°F.

EXAMPLE XXVIII

Preparation of a vinyl chloride-methylmethacrylate block copolymer

A mixture of 600 cc. of water, 20 gm. of a commercial saturated hydrocarbon sodium sulfonate wetting agent, 1 gm. of ammonium persulfate, 0.4 gm. of sodium bisulfite, 2 gm. of the product of Example XI and 200 gm. of vinyl chloride was reacted for 2 hours at 50°C. producing 70 gm. of polymer of inherent viscosity of 0.838. The polymer was filtered off and examination of the filtrate indicated that 88 wt.% of the product of Example XI was incorporated in the polymer.

The washed polyvinyl chloride was redispersed in 500 cc. of water and 6 gm. of methyl methacrylate. After stirring for 2 ¾ hours at 70°C., the product contained 87.5 wt.% polyvinyl chloride based on chlorine content.

The method employed in Examples XXVII and XXVIII has thus been shown to be a suitable and simple method for making vinyl block polymers in an aqueous environment. Its only limitation is that one of the segments must consist of a monomer which will undergo chain transfer with a tertiary amine, namely vinylchloride, acrylonitrile, methyl acrylate or vinyl acetate.

I claim:

1. The method which comprises block copolymerizing at least two different polymerizable ethylenically unsaturated monomers to produce a block copolymer capable of forming a film, said block copolymerization being in contact with an initiator in an amount sufficient to effect polymerization and ranging from 0.0001 to 0.1 part by weight of initiator per part of total monomers, said initiator consisting essentially of the reaction product at 0°C. to 25°C. of an azodiimidoether hydrogen halide of the general fromula

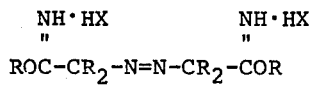

with an organic polyamino compound of the general formula R''(NR'$_2$)$_2$ wherein each R is an alkyl or cycloalkyl group of one to six carbon atoms, each R' is a hydrogen atom or an aliphatic monovalent hydrocarbon group free of aliphatic unsaturation and labile hydrogen atoms, at least one R' in said organic polyamino compound being a hydrogen atom, each R'' is a divalent group free of aliphatic unsaturation and labile hydrogen atoms and composed of atoms selected from the class consisting of carbon, hydrogen and nitrogen, there being at least two carbon atoms in each R'' group, and each X is a halogen atom, said reaction being with from one to two moles of organic polyamino compound per mole of azodiimidoether hydrogen halide.

2. The method of claim 1 wherein said polymerization is accomplished in an aqueous medium.

3. The method of claim 2 wherein said initiator consists essentially of the reaction product of two moles of organic polyamino compound per mole of azodiimidoether hydrogen halide.

4. The method of claim 3 wherein each R'' in said initiator contains from 3 to 6 carbon atoms.

5. The method of claim 4 wherein said monomers are selected from the class consisting of acrylyl olefins, alkacrylyl olefins, vinyl halides, vinylidene halides, vinyl carboxylates, vinyl aryls and diolefins.

6. The method of claim 5 wherein only one R' on each terminal nitrogen atom in said initiator contains at least about 13 carbon atoms.

7. The method of claim 6 wherein said monomers are vinyl chloride and styrene.

8. The method of claim 7 wherein said initiator is

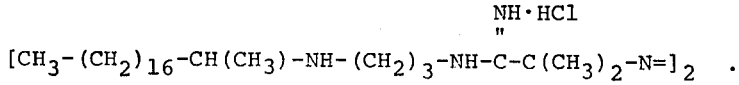

9. The film-forming polymer product of claim 2.

* * * * *